Figure 1:
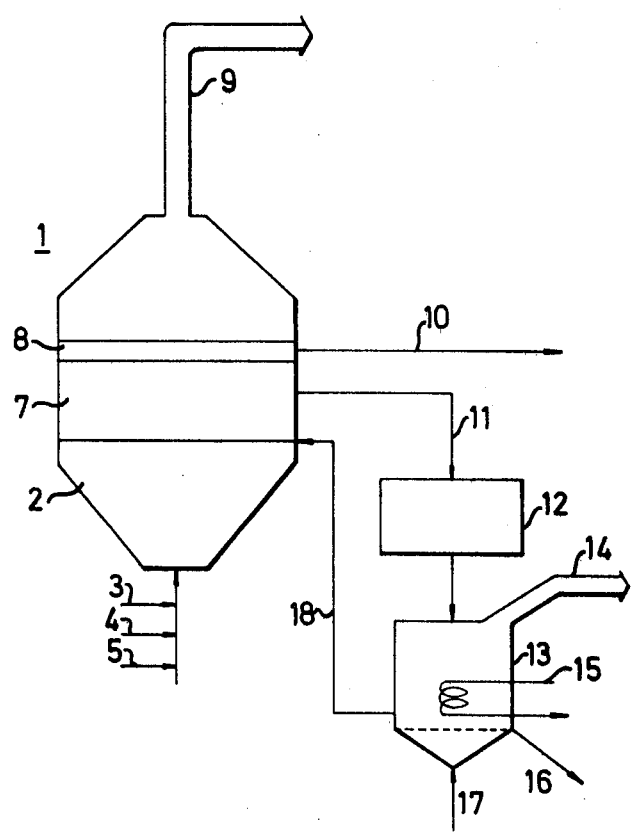

United States Patent [19]

Fahlström et al.

[11] 4,436,529

[45] Mar. 13, 1984

[54] METHOD FOR REMOVING SULPHUR IN CONJUNCTION WITH THE GASIFICATION OF CARBONACEOUS MATERIAL IN METAL SMELTS

[75] Inventors: Per A. H. H. Fahlström, Åkersberga; Karl G. Görling, Lidingö, both of Sweden

[73] Assignee: Boliden Aktiebolag, Stockholm, Sweden

[21] Appl. No.: 357,091

[22] Filed: Mar. 11, 1982

[30] Foreign Application Priority Data

Apr. 21, 1981 [SE] Sweden ............................ 8102508

[51] Int. Cl.³ .................................................. C10J 3/00
[52] U.S. Cl. ..................................... 48/197 R; 48/92; 252/373; 423/415 A
[58] Field of Search .................. 48/197 R, 202, 206, 48/210, 92; 75/30, 40, 80, 55; 201/11; 423/415 A; 252/373

[56] References Cited

U.S. PATENT DOCUMENTS

| 2,110,067 | 3/1938 | Hewer ................................ 75/55 |
| 2,700,018 | 1/1955 | Gilbert .............................. 201/11 |
| 3,155,492 | 11/1964 | Udy .................................... 75/30 |
| 3,533,739 | 10/1970 | Pelezorski et al. ................ 48/92 |
| 3,966,583 | 6/1976 | Cramer . |
| 4,187,672 | 2/1980 | Rasor ................................. 48/92 |
| 4,345,990 | 8/1982 | Fahlström et al. ................ 48/92 |
| 4,356,030 | 10/1982 | Halpin et al. ..................... 75/30 |

FOREIGN PATENT DOCUMENTS

| 2942450 | of 0000 | Fed. Rep. of Germany . |
| 2521080 | of 0000 | Fed. Rep. of Germany . |
| 2520584 | of 0000 | Fed. Rep. of Germany . |
| 2619522 | 11/1977 | Fed. Rep. of Germany . |
| 3843997 | 4/1980 | Fed. Rep. of Germany . |
| 2236915 | of 0000 | France . |
| 2005258 | 12/1969 | France . |
| 2368989 | 5/1978 | France . |
| WO80/02149 | of 0000 | PCT Int'l Appl. . |
| 397364 | of 0000 | Sweden . |
| 1225206 | of 0000 | United Kingdom . |
| 332366 | of 0000 | United Kingdom . |
| 1437750 | of 0000 | United Kingdom . |

*Primary Examiner*—Peter F. Kratz
*Attorney, Agent, or Firm*—Stevens, Davis, Miller & Mosher

[57] ABSTRACT

The invention relates to a method in the gasification of sulphur-containing carbonaceous material using metal smelts. When gasifying such carbonaceous material in a metal smelt, the material is introduced to a gasifying reactor containing an iron and/or manganese smelt having a temperature of between 1100° and 1600° C., suitably 1150°–1250° C., the smelt being substantially saturated with respect to sulphur and carbon. The carbonaceous material is oxidized to carbon monoxide and the sulphur content forms a matte phase containing a high percentage of sulphur, which phase is tapped off. Residual non-combustible material is collected as a slag on the surface and is removed together therewith. If so desired, the matte can be granulated and roasted to recover the sulphur and metal contents. Carbonaceous material incorporating pyrolysible constituents is suitably pyrolysed in a pyrolysis medium at a temperature of between 450°–800° C. prior to the gasification reaction, the temperature during the pyrolysis process being maintained, by circulating the pyrolysis medium between pyrolysis and gasification and optional combustion of carbon monoxide gas formed.

8 Claims, 3 Drawing Figures

METHOD FOR REMOVING SULPHUR IN CONJUNCTION WITH THE GASIFICATION OF CARBONACEOUS MATERIAL IN METAL SMELTS

The present invention relates to a method for removing sulphur in conjunction with the gasification of carbonaceous materials in metal smelts.

Methods for gasifying carbonaceous material are found described in a number of publications, among which SE,B, 7903283 describes a method in which first volatile and then gasifiable carbonaceous materials are released in metal smelts. The gas comprises mainly oxides of carbon in mixture with other gases, such as nitrogen and hydrogen.

When applying the method of the aforementioned patent specification to gasify carbonaceous material in a smelt containing iron and manganese, most of the sulfur present is dissolved in the melt and, subsequent to adding lime, can be absorbed to a large extent in a lime-containing slag. The slag, however, will contain at most 5–10% sulphur, and consequently when the molten material contains a considerable amount of sulphur it is necessary to form large quantities of slag, resulting in a commensurate high consumption of slag formers. Because of this it has been necessary to provide methods for eliminating and/or recovering the sulphur content of the slag and to recover the lime.

It has now been found possible to control the process in the gasifying reactor, under special conditions, in the presence of sulphur in a manner such as to separate a melt of iron, manganese or mixtures thereof into two phases, whereat substantially all the sulfur present will form a matte phase which, when the melt comprises mainly iron, at a temperature of about 1200° C. contains about 28% sulphur. Beneath this matte phase, the iron is present in a carbon-saturated iron smelt containing about 2.4% sulphur and about 4.2% carbon. The conditions are similar when manganese is present in the melt.

Sulphur is removed by tapping off the matte phase, suitably intermittently. The matte phase can be granulated in a manner known per se. The granulate can then be roasted in a fluidized-bed furnace, the sulphur content being oxidized and utilized in a normal manner.

Alternatively, the matte phase can be oxidized while in a liquid state, for example in a converter. In certain cases it may be necessary to return part of the metal content of the matte phase to the system, in order to maintain a desired metal content of the gasifying reactor. This is the case when the amount of sulphur in the ingoing material is greater than the metal content which corresponds to the matte phase. This metal deficiency can be alleviated, for example, by returning roasted products from the roasting of the granulates, or by adding another material which contains the metal used, such as iron scrap.

The present invention is based on the realization that in a phase diagram for the system between certain metals and sulphur and carbon there exists a miscibility gap. This enables said miscibility gap to be used practically when gasification is carried out in metal smelt saturated with both carbon and sulphur. If additional sulphur is added to the system, the aforementioned matte phase is separated out, said matte phase having a low solubility for carbon.

The novel method according to the invention enables the problem encountered with sulphur in conjunction with gasifying sulphur-containing fossile fuels to be more readily mastered, and also enables sulphur to be eliminated more effectively, said sulphur being troublesome environmentally.

Previous methods, in which sulphur was recovered in the form of a lime-containing sulphide slag, required large quantities of basic slag containing calcium and magnesium to be charged to the system. This was particularly unfavourable to the heat economy of the system, and also necessitated the provision of an expensive and difficult process for recovering the sulphur content and regenerating the slag former. Consequently, it has been proposed that the calcium-sulphide-containing slag shall be treated with steam, thereby releasing sulphur in the form of hydrogen sulphide and enbabling the slag formers to be reformed. This part process, however, is extremely difficult to master technically. Direct dumping of the slag is not desirable, because toxic hydrogen sulphide is released in humid atmosphere. The novel method is suited to all sulphur-containing fossile fuels to be gasified in a metal smelt. Because of the high sulphur activity in the matte phase, any remaining sulphur can be absorbed in the slag without requiring the addition of a separate basic slag former, and quite often in the absence of a separate slag former charge.

The method can also be combined to advantage with the pyrolysis of volatile constituents, in accordance with SE,B, 7903283, for example, prior to the gasification of said carbonaceous material, and subsequent to condensing ingoing condensable hydrocarbons, hydrogen sulphide can be used to recover elementary sulphur in a so-called Claus furnace, together with sulphur dioxide formed when roasting granulated matte.

The novel method is set forth in the following claims.

The invention will now be described in more detail with reference to the accompanying drawings, which are block schematics illustrating a number of embodiments of the invention.

Figure 2:
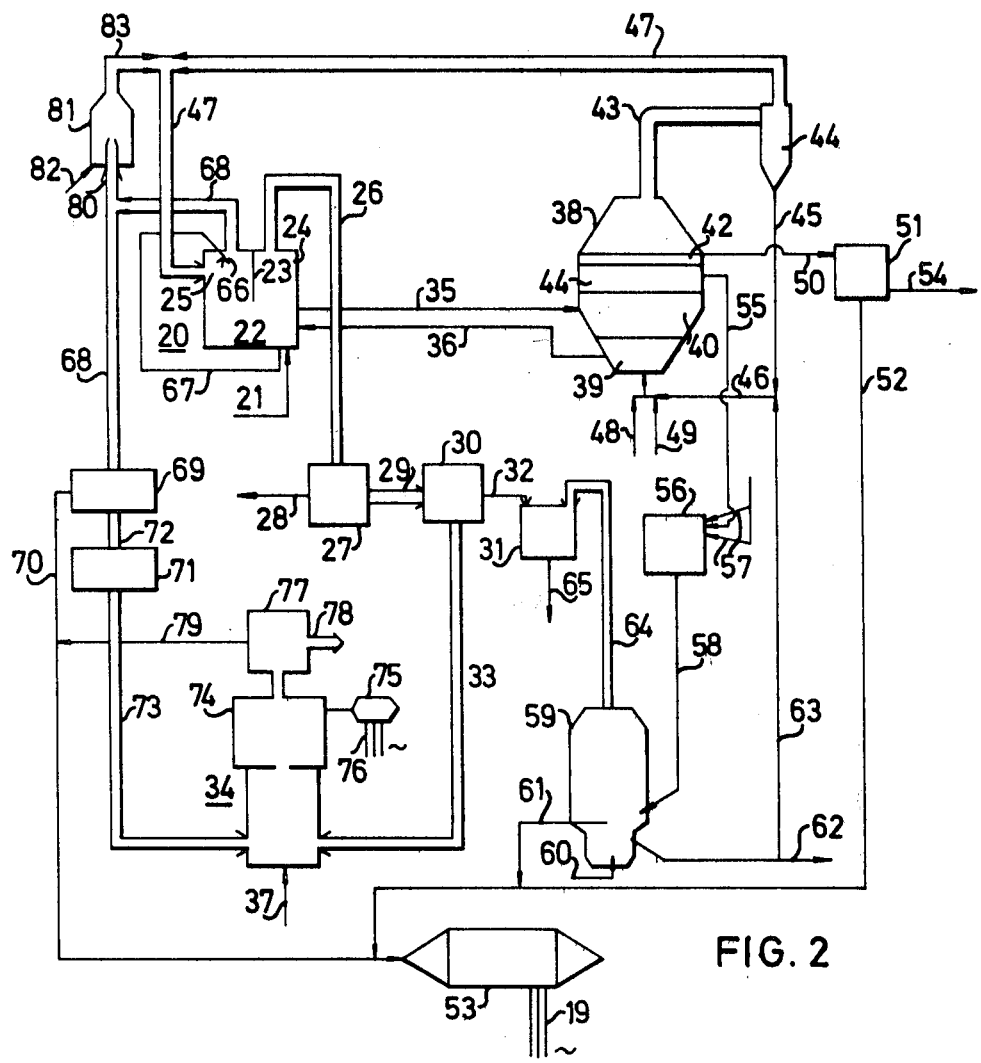

Thus, FIG. 1 illustrates one embodiment in which iron smelt is used for gasification and FIG. 2 illustrates an embodiment which also includes pyrolysis in a lead smelt.

Figure 3:
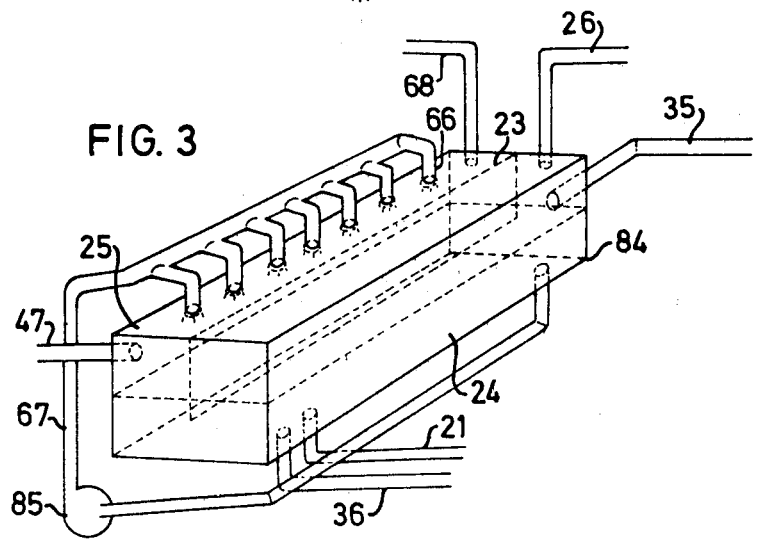

FIG. 3 illustrates an embodiment of a pyrolysis furnace according to FIG. 2.

In FIG. 1 there is shown a furnace 1 containing an iron smelt 2. The furnace is provided with means for introducing gas 3, optionally a slag former 4, and carbonaceous material 5 into the furnace. In operation there is formed in the furnace three superimposed layers, of which the lowermost layer comprises an iron smelt 2, the centre layer comprises a matte 7 rich in sulphur, and the uppermost layer comprises a slag layer 8. Gas rich in carbon monoxide is taken out through a line 9. Slag is tapped from the furnace through a line 10. Matte is taken intermittently from the matte layer through a line 11, said matte being granulated in a granulating apparatus 12 and roasted in a furnace 13, from which there is taken out a gas rich in sulphur dioxide through line 14, heat through a cooling coil 15, and roasted products through a line 16. Oxygen-containing gas is charged to the furnace through a line 17. A determined quantity of roasted products can be returned to the iron smelt 2 through a line 18, in order to maintain the requisite amount of iron.

FIG. 2 illustrates a pyrolysis furnace 20, which has the form of an elongate vessel, said furnace being more clearly illustrated in FIG. 3. Carbonaceous material, containing pyrolysable constituents, is introduced to the pyrolysis furnace 20 through a line 21, into a lead smelt 22 having a temperature of about 550° C. The furnace 20 is divided by an inner wall 23 into two chambers 24, 25 located above the lead smelt. The major part of the generated pyrolysis gases leave the one chamber 24 through a line 26, and pass to a condensation stage 27 in which oil and other condensible hydrocarbons condense, the resultant condensate being discharged through a line 28. Non-condensible gases are transferred from the stage 27 through a line 29 to a hydrogen sulphide absorption stage and desorption stage 30, where hydrogen sulphide is removed from the gases by washing with water. Hydrogen sulphide expelled from the washing liquid is then passed to a Claus furnace 31 through a line 32. The gas which has been purified of hydrogen sulphide is passed through a line 33 to a combustion furnace 34, to which a gas containing oxygen is passed through a line 37. Non-pyrolysible material is passed from the pyrolysis furnace, together with lead smelt, through a line 35 to a gasifying furnace 38, where the hot lead is injected into an iron smelt heated to a temperature of about 1200° C. Hot lead is returned to the pyrolysis furnace 20 through a line 36. In the gasifying furnace 38 the smelts separate into a bottom lead-layer 39, an iron layer 40 located immediately above the lead layer 39, a matte layer 41 and a slag layer 42 located above said matte layer 41. Gasified products, mainly carbon monoxide, are discharged from the gasifying furnace through a line 43, to a cyclone 44 where dust accompanying said products is separated therefrom and removed through a line 45 and returned to the furnace 38 through a line 46. The gas from the gasifying furnace is passed further to the chamber 25 in the pyrolysis furnace 20, through a line 47. Oxygen-containing gas and slag formers are introduced into the gasifying furnace 38 through lines 48 and 49. Slag is removed from the furnace 38 through a line 50, and transferred to a granulating apparatus 51, in which heat is removed as steam and transferred, through a line 52, to a steam turbine 53, from which electrical energy is taken out, as indicated at 19. Granulated material is removed from the apparatus 51 through a line 54. Matte is taken out through a line 55 and granulated in a granulating apparatus 56, by injecting water against a jet of matte through lines 57. The granulate is transferred to a roasting furnace 59 through a line 58.

The roasting furnace 59 has the form of a fluidized-bed furnace and is used for magnetite-yielding roasting processes. Gas containing oxygen is introduced into the furnace 59 through a line 60 and is cooled, steam being generated which is transferred o the steam turbine 53 through a line 61. The roasted products are removed through a line 62, or returned to the gasifying furnace 38 through lines 63 and 46. At least part of the sulphur-dioxide containing gas generated in the furnace 59 can be transferred, through a line 64, to a Claus furnace 31, where the ingoing sulphur dioxide, together with hydrogen sulphide entering the furnace through line 32, can form elementary sulphur, hich is led away through line 65. As before mentioned, the gas is transferred from the gasifying furnace 38 to the pyrolysis furnace 20 through line 47. The pyrolysis furnace 20 is described in more detail below with reference to FIG. 3. The furnace is provided with a row of nozzles 66 to which molten, circulating lead is passed through line 67. During its passage through the chamber 25, the gas is cooled while giving off heat, so that solid material entrained by the gas and any metal vapourized during the gasification process are absorbed by the lead smelt 22. The gas is then passed through a line 68 to a waste-heat boiler 69, in which the gas is further cooled and from which steam is transferred to the steam turbine 53 through a line 70. The cooled gas is transferred to a gas-purifying plant 71, through a line 72, and from there to the combustion furnace 34, through a line 73. The combustion furnace 34 is connected with a gas turbine 74 arranged to drive a generator 75, from which electrical energy is taken out, as indicated at 76. The waste gases are cooled in a waste-heat boiler 77, and discharged to atmosphere through a line 78. Steam generated during the cooling process is removed from the waste-heat boiler 77 and passed the steam turbine 53, through lines 79 and 70.

The amount of heat which need be supplied to the pyrolysis furnace 20 together with hot lead smelt through line 36 can be further reduced if part of the carbon-monoxide gas cooled in chamber 25 of the furnace 20 is taken from the line 68 and passed through a line 80 to a combustion chamber 81, and there burned with oxygen supplied through a line 82, and returned to the pyrolysis furnace through a line 83 and line 47.

FIG. 3 is a partial sectional view in perspective of the pyrolysis furnace 20. The furnace comprises an elongate vessel 84 containing a lead smelt 22. The vessel is divided by the inner wall 23, which extends down into the smelt 22. Carbonaceous material is introduced into the chamber 24 through the line 21. Molten lead is transferred to the gasifying reactor 38 through the line 35, and is returned through the line 36. Pyrolysis gas is led away through line 26. Arranged in the other chamber 25 is a row of nozzles 66, which spray circulating lead over gas supplied through line 47 and removed through line 68. Lead is pumped through line 67 by means of a pump 85.

EXAMPLE

Shale concentrate obtained from Närke, Sweden, was treated in the manner illustrated in FIG. 2 in a plant according to the invention. The concentrate, which was obtained by subjecting ground shale to a flotation process, contained 500 kg kerogen and 500 kg minerals per ton. The composition of the kerogen per kg (per ton) was: carbon 337.5, hydrogen 36.75, nitrogen 4.45, oxygen 84.80 and sulphur 36.80, while the mineral comprised $SiO_2$, $Al_2O_3$, $K_2O$, Cao and $Fe_2O_3$ and $FeS_2$. The total sulphur content per ton was 72 kg.

In the pyrolysis stage the concentrate produced about 130 kg of condensated hydrocarbons containing about 110 kg carbon and 84 $Nm^3$ crude gas, containing 39 kg carbon. In the gasifying stage, 185 kg of carbon were released in the form of carbon monoxide. The pyrolysis residue conveyed about 17.5 kg sulphur to the gasifying reactor vessel, of which 15.6 kg sulphur were transferred to the matte phase. Only about 2 kg sulphur need be absorbed by the slag, in equalibrium with the matte, which meant that lime did not need to be supplied separately to the slag.

The heat balance showed that for each ton of concentrate treated it was necessary to convey 2.7 tons of lead to the pyrolysis stage at a temperature of 550° C. from the gasifying stage with a temperature of 1200° C. The material entering the pyrolysis stage had a temperature of 100° C. Carbon monoxide gas generated in the gasifying stage and practically free of sulphur and ash was combusted together with non-condensible gases obtained from the pyrolysis stage. It was found that 850 kWh could be taken from the gas turbine connected to the combustion furnace, with a thermal efficiency of about 45% calculated partly on the gas turbine and partly on steam generated in the connected waste-gas boiler and in the steam turbine, with a total thermal efficiency of 35% a further 145 kWh was taken from the roasting furnace and the granulating stage 51, thus making a total of 995 kWh of the electrical energy per ton of concentrate. Further electrical energy, about 680 kWh per ton of concentrate, can be obtained, by combusting the recovered condensible hydrocarbons at a thermal efficiency of 45%. Thus, a total electrical energy of about 1.7 MWh per ton of concentrate can be obtained.

As will readily be understood, the embodiments illustrated in the Figures and described in the example merely comprise examples of the invention and can be modified within the scope of the following claims.

We claim:

1. A method for removing sulphur when gasifying metal smelts of carbonaceous material containing sulphur, characterized in that the carbonaceous material is charged to a gasifying reactor containing an iron and/or manganese smelt with a temperature of between 1100° and 1600° C. substantially saturated with respect to sulphur and carbon to form a smelt layer, a matte layer and a slag layer; and tapping off the matte layer separated from residual mineral material which is removed with slag from said slag layer.

2. A method according to claim 1, characterized in that the smelt has a temperature between 1150° and 1250° C.

3. A method according to claim 1, characterized in that the matte tapped from the reactor is granulated and then roasted in a fluidized-bed furnace.

4. A method according to claim 1, characterized in that acid or weakly-alkaline slag-forming substances are supplied to the gasifying reactor.

5. A method according to claim 1, characterized in that prior to gasification the carbonaceous material is subjected to a pyrolysis treatment process in a pyrolysis reactor containing a metal smelt at a lower temperature of between 450° and 800° C.

6. A method according to claim 5, characterized in that the hot waste gases from the gasifying reactor are cooled by passing said gases through the pyrolysis reactor.

7. A method according to claim 5, characterized in that heat is transferred from the gasifying reactor to the pyrolysis reactor with hot circulating lead smelt.

8. A method according to claim 1, characterized in granulating the removed matte, passing the matte in granulated form through a fluidized bed furnace through which oxygen containing gas is passed to produce sulphur dioxide and combining said sulphur dioxide with hydrogen sulfide to form elemental sulphur.

* * * * *